United States Patent [19]

Maeda et al.

[11] Patent Number: 5,325,371

[45] Date of Patent: Jun. 28, 1994

[54] CODING/DECODING APPARATUS

[75] Inventors: Yasuaki Maeda; Kazuhiko Fujiie, both of Tokyo, Japan

[73] Assignee: Sony Corporation, Tokyo, Japan

[21] Appl. No.: 747,001

[22] Filed: Aug. 19, 1991

[30] Foreign Application Priority Data

Aug. 24, 1990 [JP] Japan ................................. 2-222825

[51] Int. Cl.$^5$ ............................................. G06F 11/10
[52] U.S. Cl. .................................... 371/37.5; 371/39.1
[58] Field of Search ...................... 371/37.5, 39.1, 40.1

[56] References Cited

U.S. PATENT DOCUMENTS

| | | | |
|---|---|---|---|
| 4,437,185 | 3/1984 | Sako et al. | 371/37.5 |
| 4,541,092 | 9/1985 | Sako et al. | 371/37.5 |
| 4,546,474 | 10/1985 | Sako et al. | 371/37.5 |
| 4,649,542 | 3/1987 | Nishimura et al. | 371/37.5 |
| 4,677,622 | 6/1987 | Okamoto et al. | 371/37.5 |
| 4,707,805 | 11/1987 | Narusawa et al. | 371/37.5 |
| 4,852,101 | 7/1989 | Kobayashi et al. | 371/37.5 |

FOREIGN PATENT DOCUMENTS

| | | | |
|---|---|---|---|
| 0342833 | 11/1989 | European Pat. Off. | G11B 20/18 |
| 650368 | 7/1985 | France | H03N 13/22 |
| 653192 | 12/1985 | France | H03M 13/22 |
| 2082356A | 3/1982 | United Kingdom | G06F 11/10 |
| 2082809A | 3/1982 | United Kingdom | G06F 11/10 |

*Primary Examiner*—Charles E. Atkinson
*Attorney, Agent, or Firm*—Limbach & Limbach

[57] ABSTRACT

An error correction encoding apparatus for processing input data with an encoding for error correction, including first delay circuitry for applying differing delay to data words to convert input data in a first array state into data words in a second array state, a first error correction encoder for generating first check words from data words in the second array state, second delay circuitry for applying differing delay to the data words in the second array state and the first check words to generate data words and check words in a third array state, and a second error correction encoder for generating second check words from the data words and the check words in the third array state, with the delays applied by the first and second delay circuitry set so that the array states of the data words in the first and the third array states are the same. In other embodiments, the invention is an error correction decoding apparatus including a first error correction decoder for processing input data words and check words in a third array state by error correction by a second error correction code using a second check word series, first delay circuitry for applying differing delay to the corrected data words and check words from the first error correction decoder to generate data words in a second array state and first check words, a second error correcting decoder for error-correcting the data words in the second array state by a first error correction code using the first check words, and second delay circuitry for applying differing delay to the corrected data words from the second error correcting decoder to generate data words in a first array state.

11 Claims, 10 Drawing Sheets

MEMORY CONTROL IN RECORDING SYSTEM

MEMORY CONTROL IN REPRODUCING SYSTEM

| SYSTEM | SOUND QUALITY LEVEL | 16 SECTORS | PLAYBACK TIME | |
|---|---|---|---|---|
| ADPCM | A LEVEL STEREO | ▨▨□□▨▨□□▨▨□□▨▨□□ | 2 HOURS | CD-I |
| ADPCM | A LEVEL MONAURAL | ▨□□□▨□□□▨□□□▨□□□ | 4 HOURS | |
| ADPCM | B LEVEL STEREO | ▨□□□▨□□□▨□□□▨□□□ | 4 HOURS | |
| ADPCM | B LEVEL MONAURAL | ▨□□□□□□□▨□□□□□□□ | 8 HOURS | CD-ROM XA |
| ADPCM | C LEVEL STEREO | ▨□□□□□□□▨□□□□□□□ | 8 HOURS | |
| ADPCM | C LEVEL MONAURAL | ▨□□□□□□□□□□□□□□□ | 16 HOURS | |
| PCM | CD-DA | ▨▨▨▨▨▨▨▨▨▨▨▨▨▨▨▨ | 62 TO 75 MINUTES | |

FIG. 11

CODING/DECODING APPARATUS

BACKGROUND OF THE INVENTION

1. Field of the Invention

This invention relates to an apparatus for coding and decoding for error correction employed in a recording and/or reproducing system for an optical disk or the like.

2. Description of Related Art

In a disk apparatus employing an optical disk as a recording medium, such as a player for a compact disc (CD) having concentric tracks on which digital audio data, for example, are recorded as a string of pits, a laser beam is irradiated along the tracks on the disc which is rotationally driven at a constant linear velocity (CLV) by a spindle motor, and changes in the intensity of the reflected light caused by the presence or absence of the pits are detected for reproducing the digital audio data.

During data reproduction by the CD player, an error rate may reach an order of $10^{-5}$. In order to combat this, a cross-interleave Reed-Solomon code (CIRC), which is combined from the Reed-Solomon code, an error correcting code having a high random error correcting ability, and means for converting the burst error into a random error using an interleaving technique, is used for error correction, so that no hindrances are produced under ordinary operating environments.

In an audio data recording system, which uses the CIRC, uses an encoding apparatus 110 arranged and constructed as shown in FIG. 9. Digital audio data are inputted to the encoding apparatus in parallel, with 6 samples, that is 16 2 6 equal 192 bits or 24 bytes, for each of left and right channels, as one unit. These input data are rearranged after the data of the even-numbered samples are delayed by a scrambling circuit by two CIRC units. The input data, rearranged by a scrambling circuit 111, are subjected to encoding of the first error correction code $C_2$ by a first error code generator 112, so as to be supplied to an interleaving circuit 113 after the parity Q of the Reed-Solomon code of $m=8$, $n=28$, $k=24$ and $d=5$ is appended thereto. The interleaving circuit 113 applies different amounts of delay to the data such that the maximum amount of delay of 108 frames is applied for interleaving. The parity P of the Reed-Solomon code of $m=8$, $n=32$, $k=28$ and $d=5$ is appended to the data interleaved by the circuit 113, by way of encoding by the second error correction code $C_1$ by a second error correction code generator 114. The input data, to which the parities Q and P have been appended in this manner, are processed by an odd number delay circuit 115 where only odd-numbered symbols are further delayed by one symbol and the signs of the parities Q and P are inverted to provide a 32 byte long CIRC encode output which is to be recorded.

In a reproducing system for digital audio data, which uses the above CIRC, a decoding apparatus 120 shown in FIG. 10 is employed. In the decoding apparatus, playback data of the data encoded by the encoding apparatus 110 are supplied to an even-number delay circuit 121 where even-numbered symbols are delayed by one frame, and the signs of the parities Q and P are inverted. Error correction is performed in a first error correction circuit 122 by the second error correction code $C_1$ on the basis of the parity P. The playback data, thus error corrected by the first error correcting circuit 122, are deinterleaved by a deinterleaving circuit 123 which applies a delay which is an inversion of that applied by the interleaving circuit 113 of the encoding apparatus 110 before being supplied to a second error correcting circuit 124. The second error correcting circuit 124 performs an error correction by a first error correcting code $C_2$ on the basis of the parity Q. The playback data, thus error-corrected by the first error correcting code $C_1$ and the second error correcting code $C_2$, are descrambled by a descrambling circuit 125 by data rearrangement corresponding to that performed by the scrambling circuit 111 in the encoding apparatus.

The above described encoding and decoding apparatus have been arranged as integrated circuits and extensively used as encoder and decoder for CIRC processing.

Meanwhile, there has been prescribed for the compact disc (CD) a data format in which 24 channel bit synchronizing signals, produced as eight to fourteen modulation data or EFM data converted from the 8-bit-per-symbol signals, are converted into 14 channel bit data, 14 channel bit or 1-symbol sub-code, 14 32 channel bit or 32 symbol data per se, such as play data and parity data, and each 3 channel bit margin bits provided between adjacent symbols, totalling 588 channel bits, are arranged as one frame and 98 frames are arranged as a sub-code block.

It is noted that, in a so-called CD-interactive (CD-I) system for the compact disc (CD) for simultaneously recording image data, letter data etc. besides audio data, six modes have been prescribed besides the CD-DA mode as, for example, audio data, as shown in FIG. 11.

Thus, for the CD-DA mode having the sound quality level corresponding to the current 16-bit PCM (pulse code modulation), straight PCM (straight pulse code modulation) with the sampling frequency of 44.1 kHz and the number of quantizing bits of 16, is used. For the A level stereo mode and the A level monaural mode having the sound quality corresponding to the long-playing record, ADPCM (adaptive differential pulse code modulation) with the sampling frequency of 37.8 kHz and the number of quantizing bits of 8, is used. For the B level stereo mode and the B level monaural mode having the sound quality corresponding to FM broadcasting, adaptive PCM or ADPCM having the sampling frequency of 37.8 kHz an the number of quantizing bits of 4, is used. Finally, for the C level stereo mode and the C level monaural mode, having the sound quality corresponding to the AM broadcasting, ADPCM with the sampling frequency of 18.9 kHz and the number of quantizing bits of 4, is used.

That is, referring to FIG. 11, where a rectangle mark in black denotes a sector where data are not recorded, the bit reduction rate for the A level stereo mode is one-half that of the CD-DA mode, so that data are recorded at every other sector, with the playback time for a disc being approximately two hours. For the A level monaural mode, the bit reduction rate is ¼ and data are recorded at every four sectors, with the playback time for a disc being about four hours. For the B level stereo mode, the bit reduction rate is ¼ and data are recorded at every four sectors, with the playback time for a disc being about four hours. For the B level stereo mode, the bit reduction rate is ⅛ and data are recorded at every eight sectors, with the playback time for a disc being about eight hours. For the C level stereo mode, the bit reduction rate is ⅛ and data are recorded at every eight sectors, with the playback time for a disc being about eight hours. For the C level monaural mode, the bit reduction rate is 1/16 and data are recorded at every 16 sectors, with the playback time for a disc being about 16 hours.

Meanwhile, in the digital audio data reproducing system employing the above described CIRC, if burst errors beyond the correction capabilities should occur in playback data, the errors are distributed evenly throughout an interleaving length and thereby rendered less manifest. With a CD player handling continuous PCM audio data, error data may be interpolated by near-by data, so that foreign sounds are less likely to be produced. However, if the data are those which lack in correlation between adjacent data, or the compressed audio data according to the above-mentioned CD-I system, it is not possible to correct errors in the playback data by near-by data. Therefore, if burst errors in excess of the correction capabilities are produced in the playback data and the errors are evenly distributed throughout the interleaving length, the errors occur discretely for the interleaving length, that is for a time longer than 14.7 ms for the CD-DA mode, so that more data than the errors per se become unusable.

OBJECT AND SUMMARY OF THE INVENTION

In view of the above described status of the art, it is a principal object of the present invention to provide an encoding apparatus and a decoding apparatus in which the correction capabilities by the customary CIRC are maintained and in which, should burst errors exceeding the correction capabilities be produced in the playback data, the errors are not distributed throughout the interleaving length.

The present invention provides an encoding apparatus for applying different amounts of delay to respective bit data constituting a data block, first check word generating means for generating first check words by a first error correction code from the respective bit data from said first delay means, second delay means for applying different amounts of delay to the respective bit data from said first delay means, and second check word generating means for generating a second check word by a second error correcting code from the respective bit data from said second delay means, wherein equal amounts of delay are applied by the first and second delay means to the respective data constituting said data block, and wherein first and second check words generated by the first and second check word generating means are appended to the respective bit data of the data block.

The present invention also provides a decoding apparatus comprising first error correction means for processing respective bit data encoded by the encoding apparatus by error correction by a second error correction code using said second check word, first delay means for applying the same amount of delay as that applied by said first delay means of the encoding apparatus to the respective bit data error corrected by the first error correcting means, second error correcting means for processing the respective bit data from said first delay means by error correction by a first error correction code using said first check word, and second delay means for applying the same amount of delay as that applied by the second delay means of the encoding apparatus to the respective bit data corrected for errors by the first error correcting means.

BRIEF DESCRIPTION OF THE DRAWINGS

FIG. 11 shows a data format of the CD-I.

DESCRIPTION OF PREFERRED EMBODIMENTS

Figure 1:
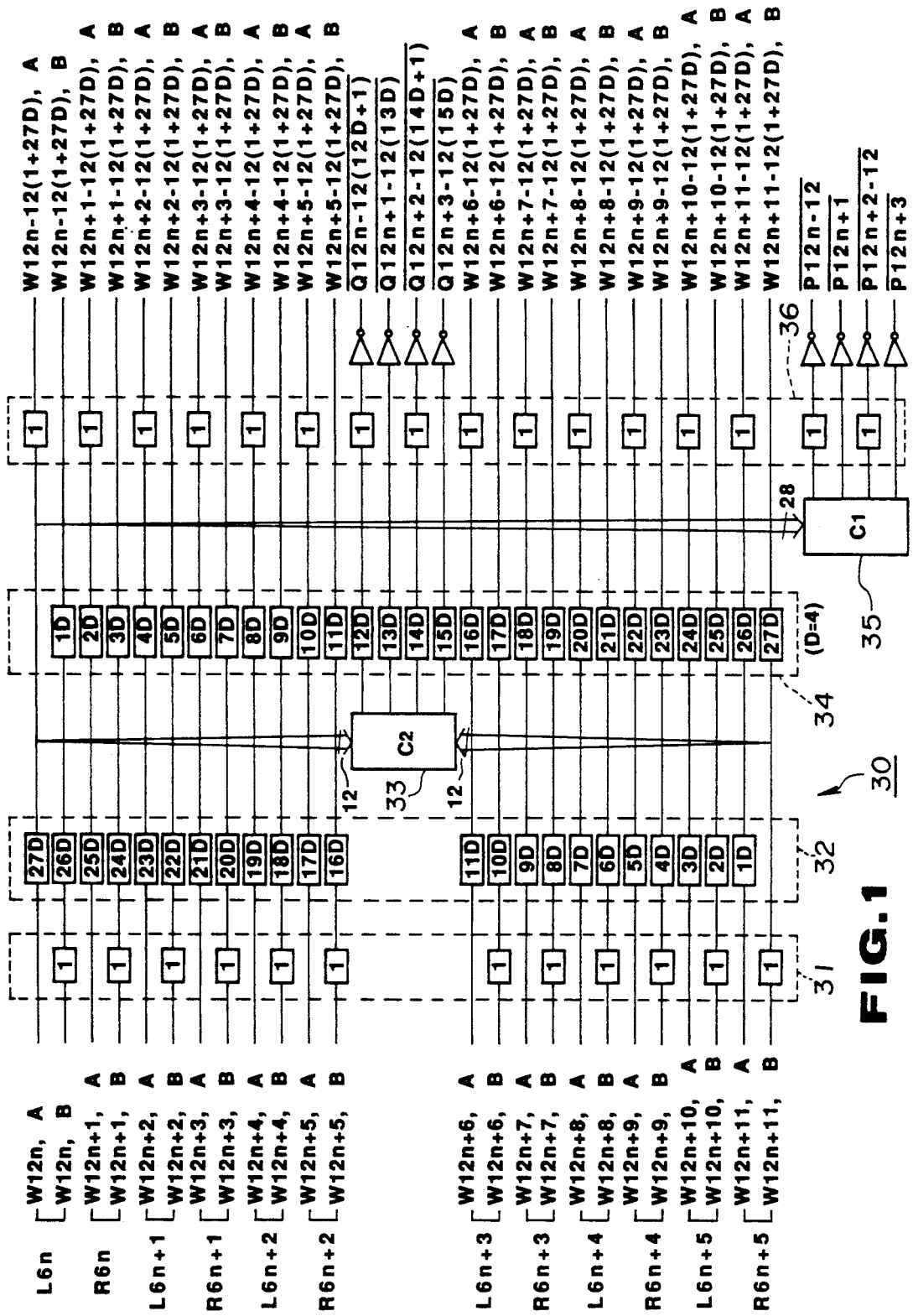
FIG. 1 is a block diagram showing an arrangement of an encoding apparatus according to the present invention.

By referring to the drawings, illustrative embodiments of an encoding apparatus and a decoding apparatus according to the present invention will be explained in detail.

Figure 5:
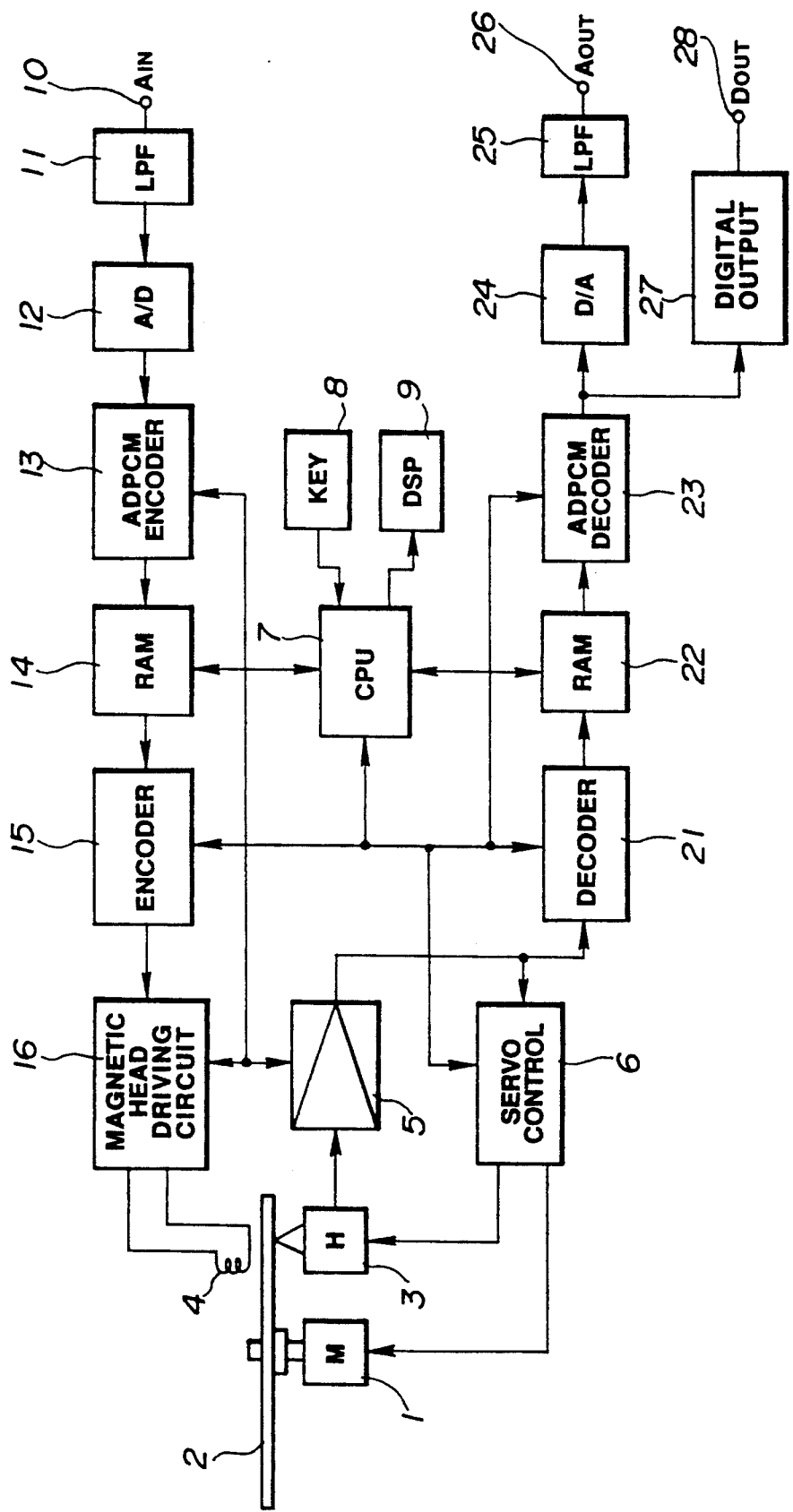
FIG. 5 is a block diagram showing an arrangement of a disc recording and/or reproducing apparatus which uses an encoding apparatus and a decoding apparatus according to the present invention.

The encoding apparatus and the decoding apparatus according to the present invention are applied to an encoder 30 of a recording system and to a decoder of a reproducing system, respectively, of an optical disc recording and/or reproducing system for recording and/or reproducing digital audio data, shown for example in FIG. 5.

Turning to FIG. 1, the encoding apparatus according to the present invention includes a first delay circuit 32 applying different amounts of delay to data of respective bits constituting each data block, a first check word generating circuit 33 for generating a first check word by a first error correction code for the data of the respective bits from the first delay circuit 32, a second delay circuit 34 for applying different amounts of delay to the data of the respective bits from the first delay circuit 32, and a second check word generating circuit 35 for generating a second check word by a second error correction code.

The encoding apparatus 30 shown in FIG. 1 is designed for processing digital audio data conforming to the CD standard by an encoding equivalent to the above mentioned CIRC. To this encoding apparatus 30, there are inputted in parallel 6 samples, that is 16 bits ×2×6 or 192 bits or 24 bytes as one unit for each of the left and right channels. These input data are supplied to the first delay circuit 32 via an even-number delay circuit 31 delaying the even-numbered symbol by one frame.

The first delay circuit 32 applies different amounts of delay to the input data by way of an interleaving in which the maximum delay amounts to 108 frames at D=4.

The first check word generating circuit 33 is designed for processing the input data, thus interleaved by the first delay circuit 32, by an encoding with the first error correction code $C_2$, for appending the parity Q of the Reed-Solomon code of m=8, n=28, k=24 and d=5 to the input data.

The second delay circuit 34 applies different amounts of delay to the interleaved data from the first delay circuit 32 so that the sum-total of the amounts of the delay applied to the data will be equal. That is, the delay circuit 34 resolves the interleaving applied by the first delay circuit 32.

On the other hand, the second check word generating circuit 35 processes the deinterleaved data from the second delay circuit 34 with encoding with the second error correction code $C_1$ for appending the parity P of the Reed-Solomon codes of m=8, n=32, k=28 and d=5 to the deinterleaved data. The data with the appended parities Q and P are processed by an even number delay circuit 36 which produces a one-frame delay for only odd-numbered symbols so that the same amounts of delay are applied to the data in their entirety. The parities Q and P are inverted in sign to provide a 32 byte encoding output of CIRC which is to be recorded.

The encoded output from the above described encoding apparatus 30 has the correcting capabilities equivalent to those of the customary CIRC, because the parity Q generated by the first check word generating circuit 33 from the interleaved input data from the first delay circuit 32 and the parity P generated by the second check word generating circuit 35 from the second delay circuit 34 have been appended to the encoded output. In addition, since the same amount of delay in sum-total is afforded to the data of the encoded output of the encoding apparatus by the first and second circuits 32, 34, while the encoded output is not interleaved, there is no risk of error distribution even if burst errors in excess of the correction capabilities should occur in the recording and/or reproducing system.

Figure 2:
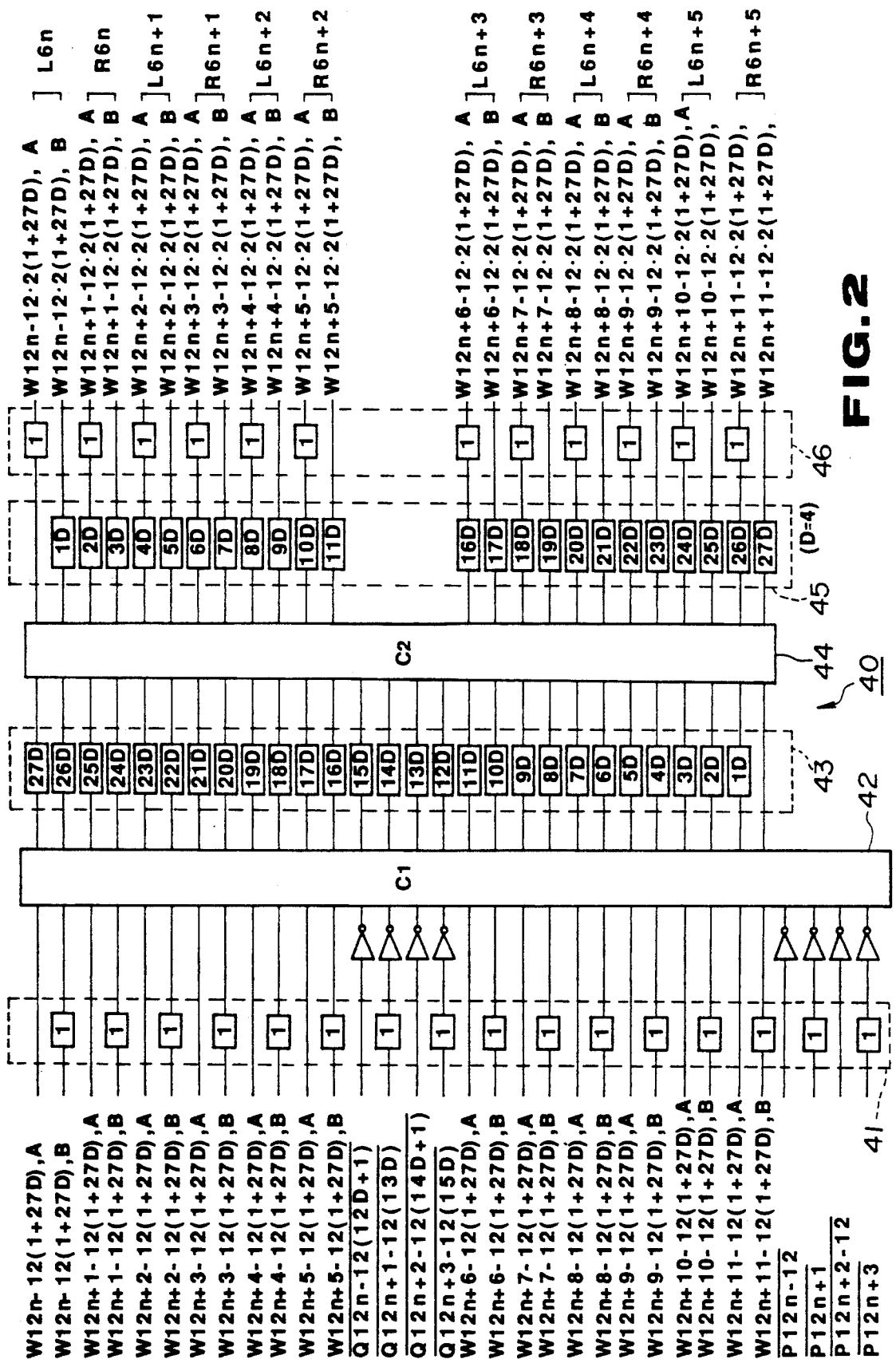
FIG. 2 is a block diagram showing an arrangement of a decoding apparatus according to the present invention.

The decoding apparatus according to the present invention for decoding an encoded output produced by the encoding apparatus 30 is constructed as shown for example in FIG. 2.

Turning to FIG. 2, showing the decoding apparatus 40, data reproduced from the encoded data from the encoding apparatus 30 are processed by an even number delay circuit 41 so that the even-numbered symbols are delayed by one frame. The parities Q and P are then inverted in sign. An error correction is then performed by the first error correcting circuit 42 with the second error correction code $C_1$ on the basis of the parity P. The playback data, thus error-corrected by the first error correcting circuit 42, are interleaved by a first delay circuit 43 which applies the same amount of delay to the data as that afforded by the first delay circuit 32 in the decoding apparatus 30 before being supplied to a second error correcting circuit 44. The second error correction circuit 44 effectuates an error correction with the first error correction code $C_2$ on the basis of the parity Q. The playback data, thus corrected for errors by the first error correcting code $C_2$ and the second error correction code $C_1$, are processed by a second delay circuit 45 applying the same amount of delay to the playback data as that applied by the second delay circuit 34 in the above encoding circuit 30, whereby the interleaving applied by the first delay circuit 43 is released. The deinterleaved data are processed by the odd number delay circuit 46 which delays only odd-numbered data by one frame, so that the data are outputted with the same amount of delay for the respective data.

Figure 3:
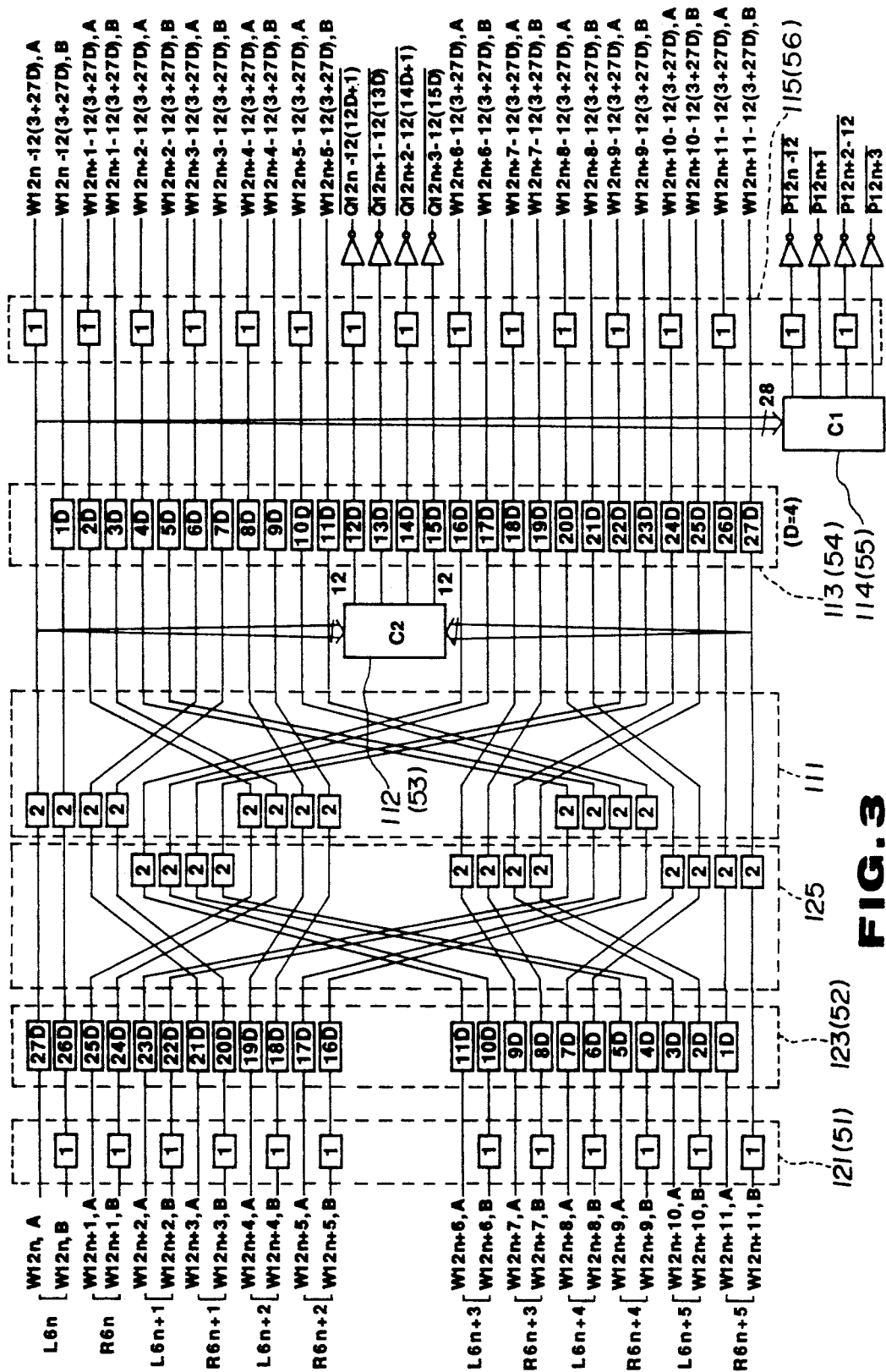
FIG. 3 is a block diagram showing a modified embodiment of the encoding apparatus according to the present invention.

It is noted that an encoding apparatus having the same function as that of the encoding apparatus 30 shown in FIG. 1 may also be constructed by combining a part of the function of an encoder and a decoder presented as an IC for CIRC processing. Thus the encoding apparatus may be constructed as shown in FIG. 3 by connecting a decoding apparatus 120 shown in FIG. 10 to an input side of an encoding apparatus 110 shown in FIG. 9. In this case, the decoding apparatus 120 is used for skipping first and second error correcting circuits 122, 124 in FIG. 10. The operation performed by a scrambling circuit 111 enclosed within the encoding apparatus 110 is canceled by a descrambling circuit 125 connected to an input stage.

Figure 9:
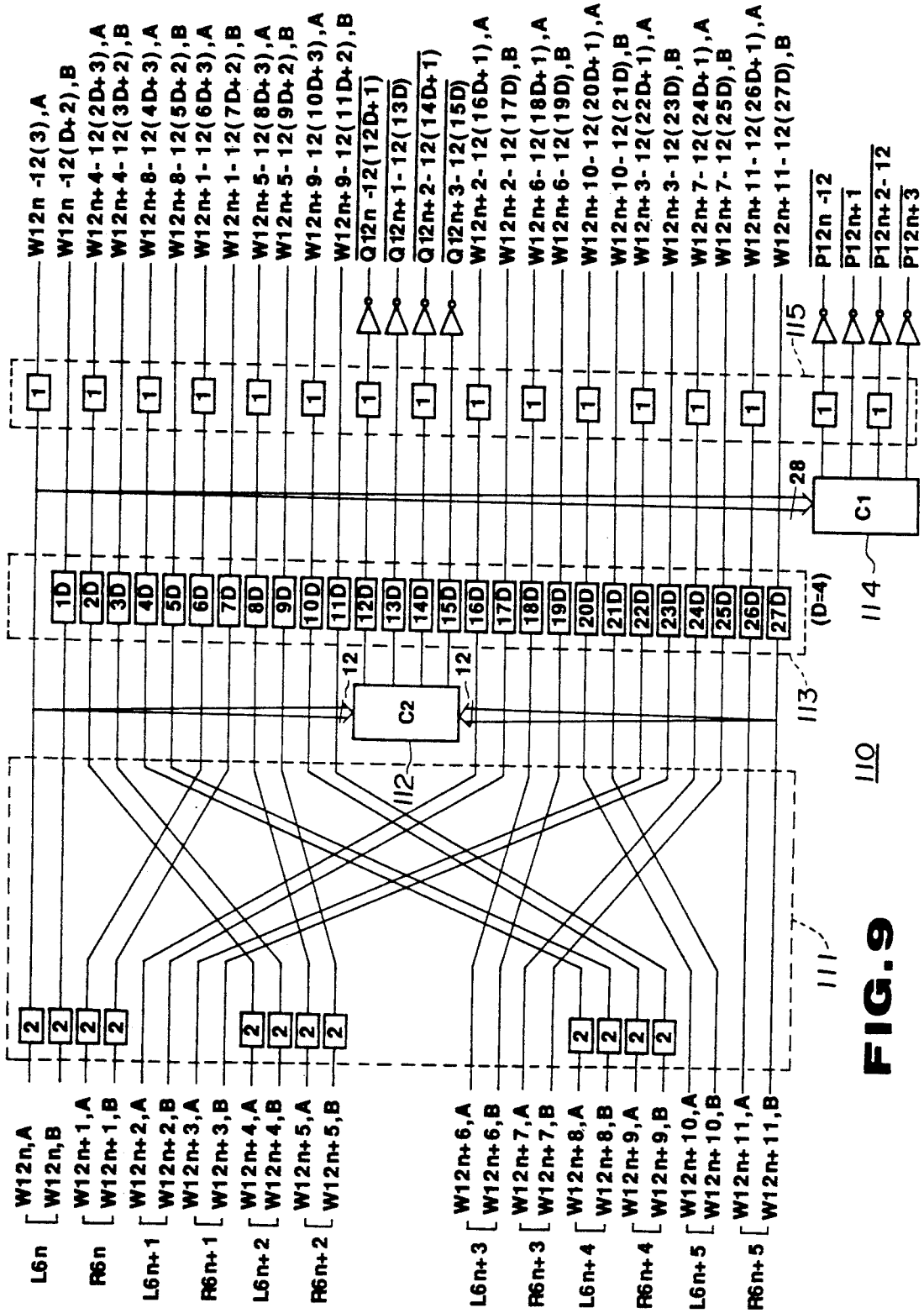
FIG. 9 is a block diagram showing an arrangement of a conventional encoding apparatus used in a CD player.
Figure 10:
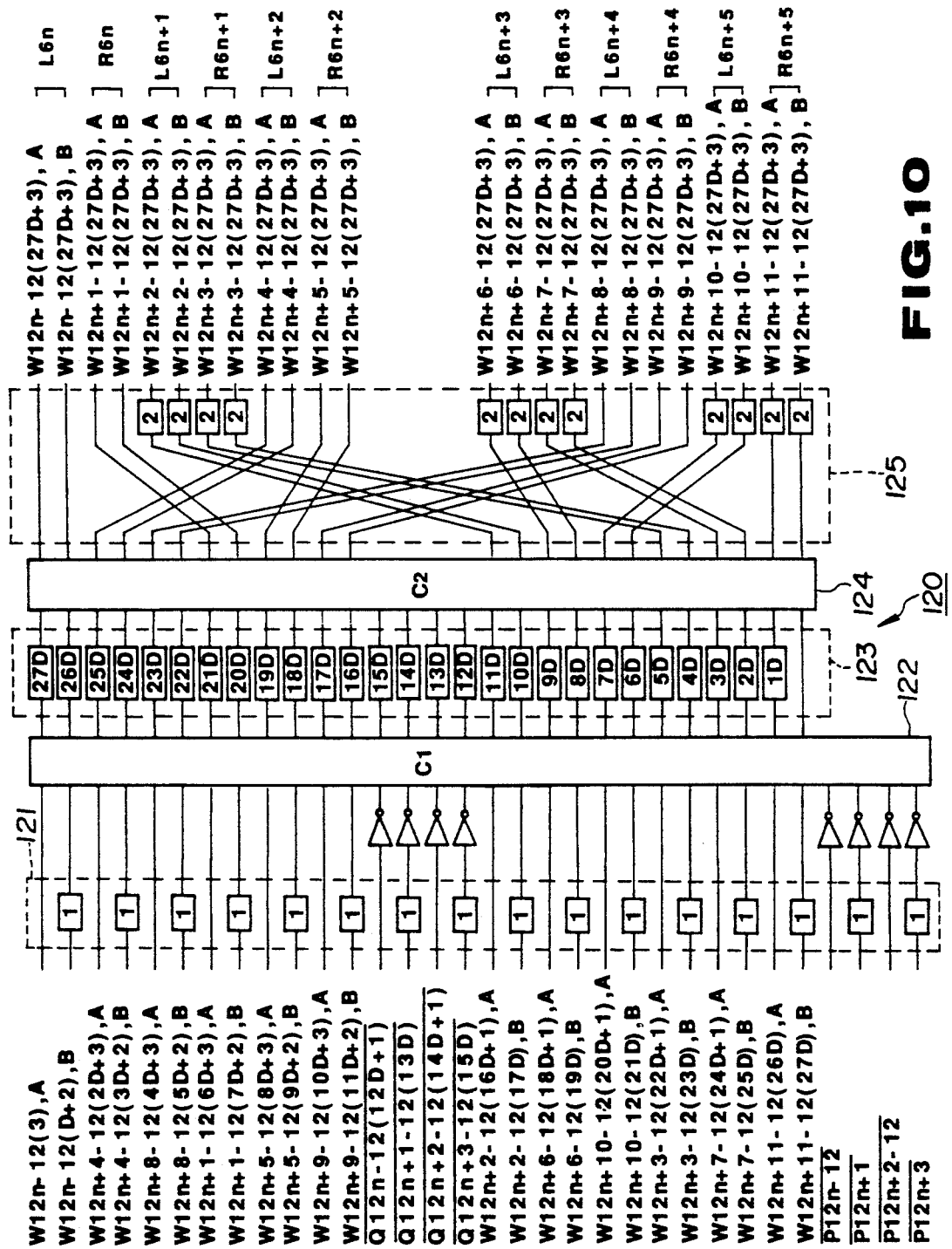
FIG. 10 is a block diagram showing an arrangement of a conventional decoding apparatus used in a CD player.

As shown by bracketed reference numerals in FIG. 3, a deinterleaving circuit 123 of the decoding apparatus 120 shown in FIG. 10 is used as a first delay circuit 52 of the encoding apparatus 50 of the present invention. On the other hand, an interleaving circuit 113 of the encoding apparatus 110 shown in FIG. 9 is used as a second delay circuit 54 of the encoding apparatus 50 of the present invention, and first and second correcting code generators 112, 115 of the encoding apparatus 110 shown in FIG. 9 are used as the first and second check word generating circuits 53, 55 in the encoding apparatus 50 of the present invention.

Figure 4:
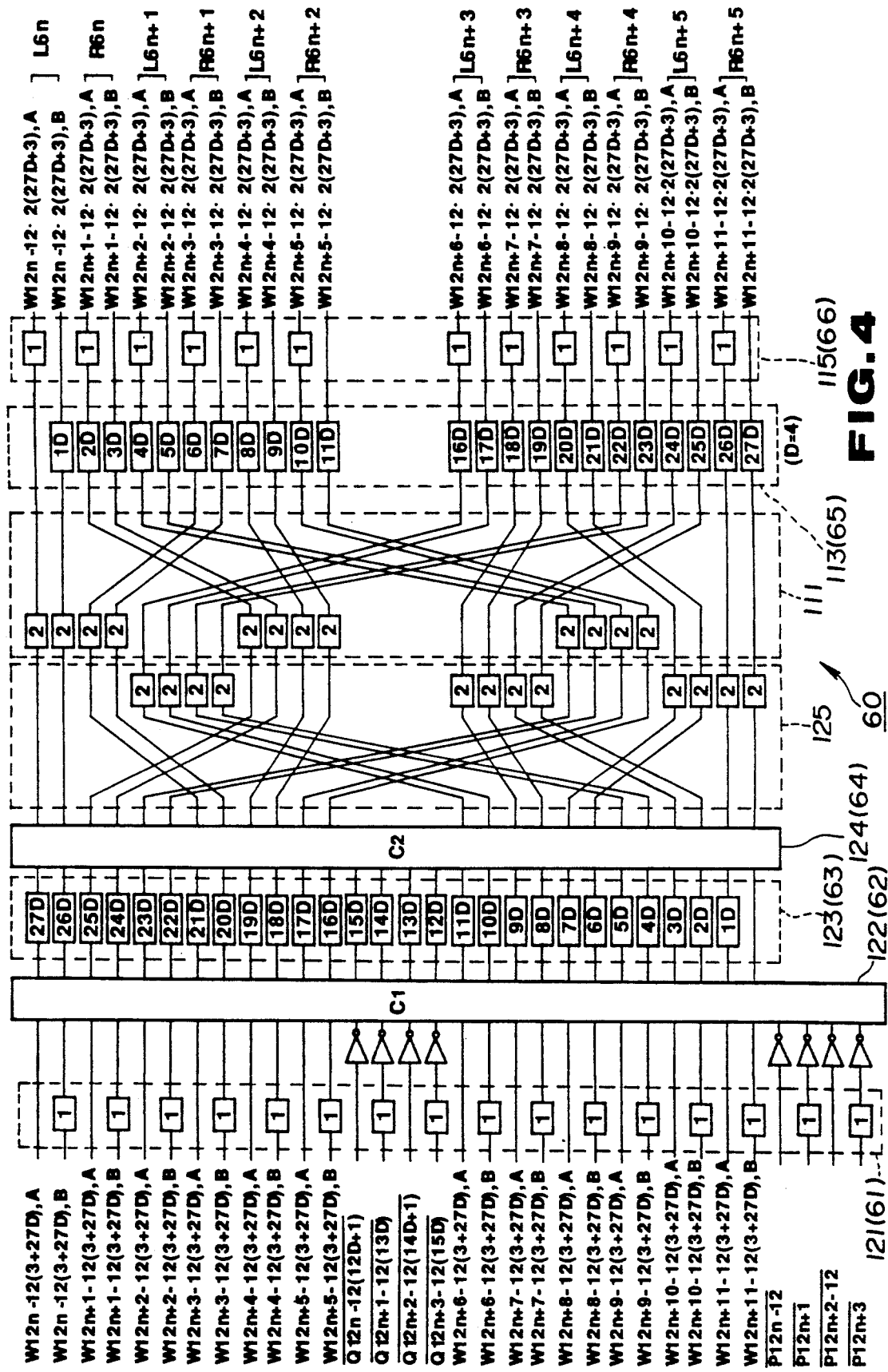
FIG. 4 is a block diagram showing a modified embodiment of the decoding apparatus according to the present invention.

It is noted that a decoding apparatus having the same function as that of the decoding apparatus 30 shown in FIG. 2 may also be constructed by combining a part of the function of an encoder and a decoder presented as an IC for CIRC processing. Thus the encoding apparatus may be constructed as shown in FIG. 4 by connecting the decoding apparatus 120 shown in FIG. 10 to an output side of the encoding apparatus 110 shown in FIG. 9. In this case, the operation performed by the descrambling circuit 125 enclosed in the decoding apparatus 120 shown in FIG. 10 is counteracted by the scrambling circuit 110 connected to an output stage.

As shown by bracketed reference numerals in FIG. 4, the first and second error correcting circuits 122, 124 of the decoding apparatus 120 are used as the first and second error correcting circuits 62, 64 in the decoding apparatus 60 of the present invention. On the other hand, the deinterleaving circuit 123 of the decoding circuit 120 is used as the first delay circuit 63 of the decoding circuit 60 of the present invention, while the interleaving circuit 113 of the encoding apparatus 110 is used as the second delay circuit 65 of the decoding apparatus 60 of the present invention.

The disc recording and/or reproducing apparatus, which uses the encoding apparatus and the decoding apparatus of the present invention, is hereinafter explained.

Referring to FIG. 5, the disc recording and/or reproducing apparatus is provided with a magneto-optical disc 2, rotationally driven by a spindle motor 1, as a recording medium, and effectuates data recording by thermomagnetic recording. The optical head 3 also detects the laser light reflected from the object track to detect focusing errors by a so-called astigmatic method, while detecting tracking error by a so-called pushpull method. For reproducing data from the magneto-optical disc 2, the optical head 3 detects the difference in the polarization angle (Kerr rotation angle) of the reflected light from the target track to generate reproduced signals.

The output of the optical head 3 is supplied to an RF circuit 5. The Rf circuit 5 extracts the focusing error signal and the tracking error signal from the output of the optical head 3 and transmits the extracted signals to a servo control circuit 6, while converting playback signals into corresponding binary signals to a decoder 21 of the reproducing system, which will be explained subsequently.

The servo control circuit 6 is constituted by a focusing servo circuit, a tracking servo circuit, a spindle motor servo control circuit and a thread servo control circuit, although these circuits are not shown. The focusing servo control circuit executes focusing control of an optical system of the optical head 3 so that the focusing error signal will be reduced to zero. The tracking servo control circuit executes tracking control of the optical system of the optical head 3 so that the tracking error signal will be reduced to zero. The spindle motor servo control circuit, controls the spindle motor 1 for rotationally driving the magneto-optical disc 2 at a predetermined rotational velocity, such as at a constant linear velocity. The thread servo control circuit causes the optical head 3 and the magnetic head 4 to be moved to a target track position on the magneto-optical disc 2 designated by a system controller 7. The servo control circuit 6, which executes these various control operations, transmits an information indicating operating states of components control led by the servo control circuit 6 to the system controller 7.

A key input operating section 8 and a display section 9 are connected to the system controller 7. The system controller 7 controls the recording system and the reproducing system with the operating modes designated by an operating input information from the key input operating section 8. The system controller 7 supervises, on the basis of a sector-by-sector address information reproduced from the recording track of the magneto-optical disc 2 by the header time or sub-Q data, the recording position as well as the reproducing position on the recording track traced by the optical head 3 and the magnetic head 4.

The recording system of the disc recording and/or reproducing apparatus is provided with an A?D converter 12 supplied with an analog audio signal $A_{IN}$ from an input terminal 10 by way of a low-pass filter 11.

The A/D converter 12 quantizes the audio signal $A_{IN}$ to generate digital audio data of a predetermined transfer rate corresponding to the CD-I system. The digital audio data from the A/D converter 12 are supplied to an ADPCM encoder 13.

Figure 6:
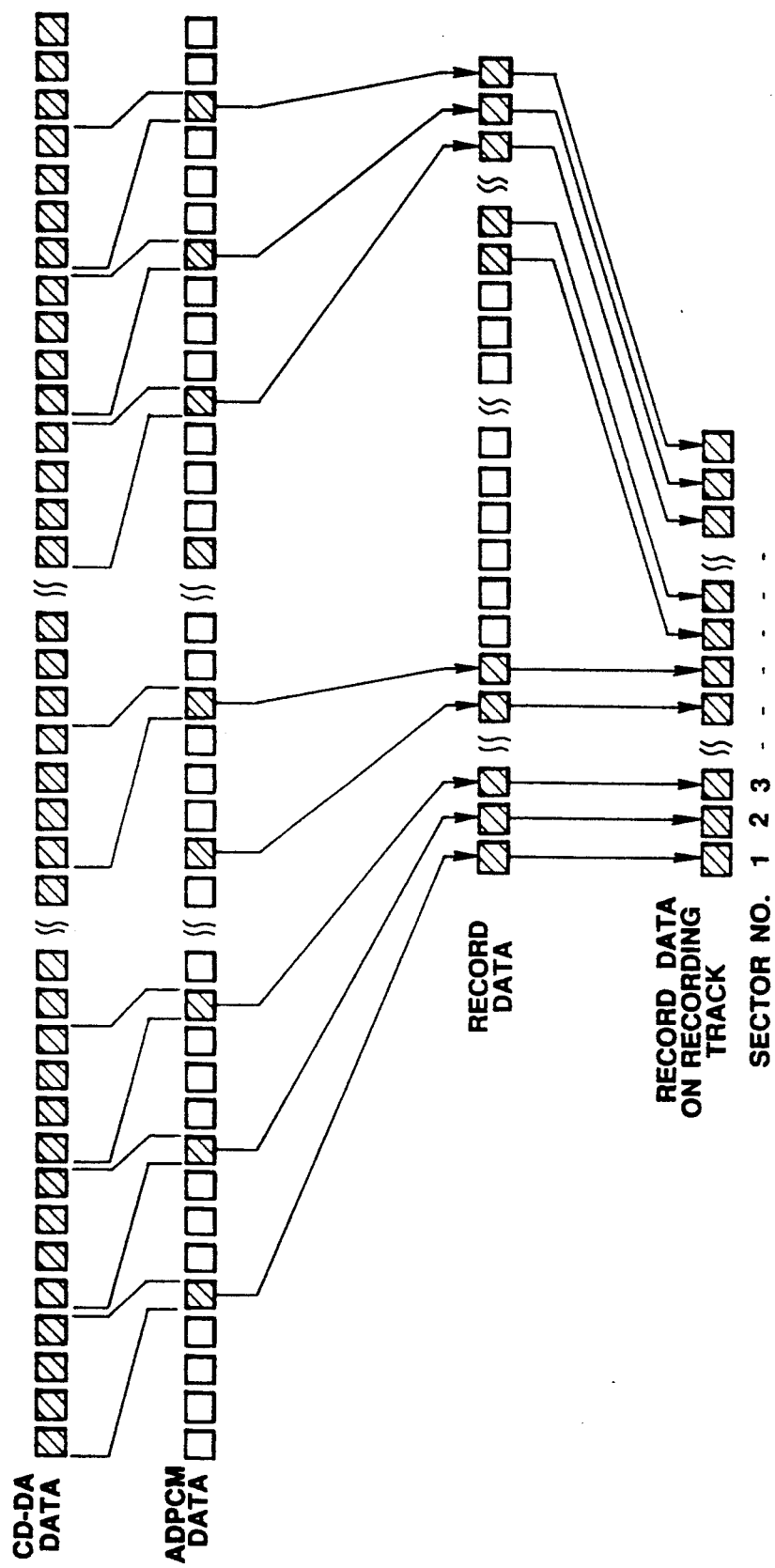
FIG. 6 shows a data format employed in the disc recording and/or reproducing apparatus shown in FIG. 5.

The ADPCM encoder 13 is adapted for processing the predetermined transfer rate digital audio data quantized from the audio signal $A_{IN}$ by the A/D converter 12 by a data compressing operation in conformity to the various modes in the CD-I system, and has its operating mode designated by the system controller 7. With the present disc recording and/or reproducing apparatus, the digital audio data of the CD-DA mode shown for example in FIG. 6 are compressed by ¼ by the ADPCM encoder 13 into B level stereo mode ADPCM audio data having the transfer rate of 18.75 (75/4) sectors/second. The B level stereo mode ADPCM audio data, continuously outputted from the ADPCM encoder 13 at the transfer rate of 18.75 sectors/second, are supplied to a memory 14.

The memory 14 is controlled as to data writing and readout by system controller 7. The B level stereo mode ADPCM audio data, supplied from the ADPCM encoder 13, are written continuously into this memory 14 at the transfer rate of 18.75 sectors/second. Also the B level stereo mode ADPCM audio data, continuously written into the memory 14 at the transfer rate of 18.75 sectors/second, are read out in a burst manner as record data from the memory 14 at the transfer rate of 75 sectors/second.

Figure 7:
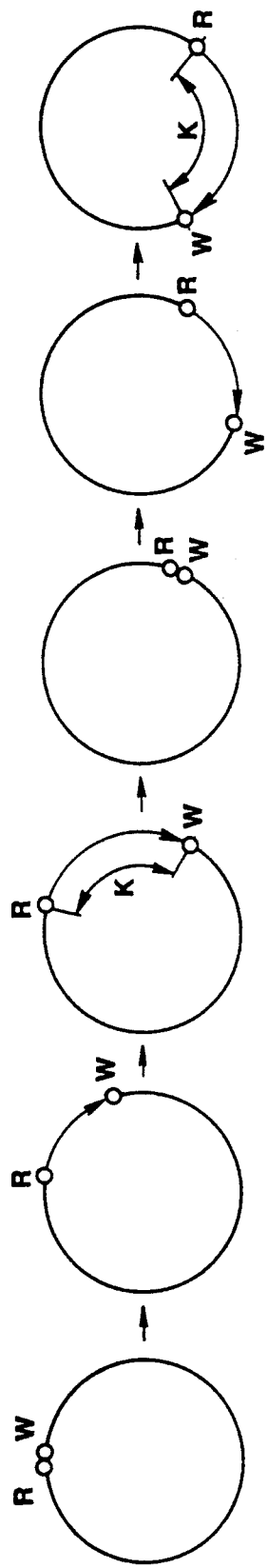
FIG. 7 shows the state of a controlled memory of a recording system of the disc recording and/or reproducing apparatus shown in FIG. 6.
Figure 8:
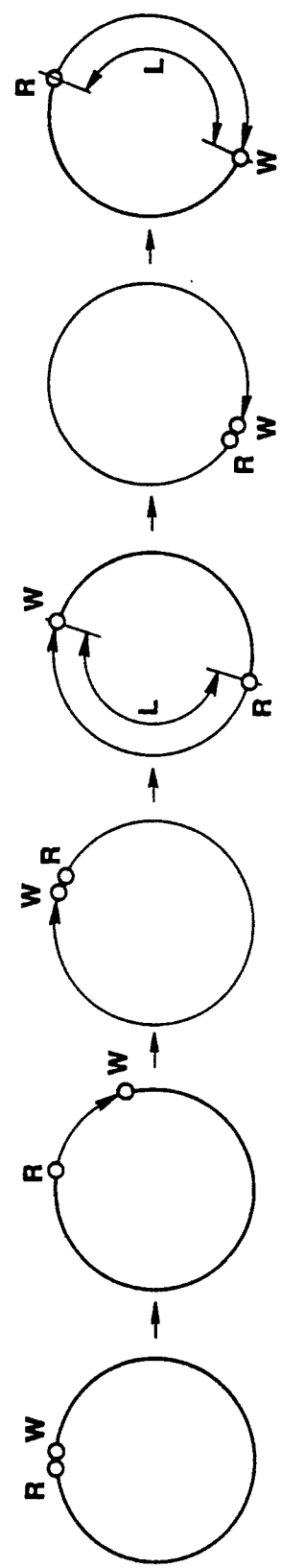
FIG. 8 shows the state of a controlled memory of a reproducing system of the disc recording and/or reproducing apparatus shown in FIG. 6.

Referring to FIG. 7, the memory 14 is controlled by system controller 7 so that a write pointer W of the memory 14 is continuously incremented at the transfer rate of 18.75 sectors/second to write the ADPCM audio data in the memory 14 at the transfer rate of 18.75 sectors/second and, if the data volume stored in the memory 14 exceeds a predetermined volume K, increments a read pointer R of the memory 14 in a burst manner at the transfer rate of 75 sectors/second to read out the predetermined volume K of the ADPCM data from the memory 14 as record data in a burst manner at the transfer rate of 75 sectors/second.

The ADPCM audio data read out in the burst manner from memory 14 at the transfer rate of 75 sectors/second, that is the record data, are supplied to an encoder 15.

The record data supplied in a burst fashion from the memory 14 is processed by the encoder 15 with an error correcting coding operation, such as by parity addition or interleaving or eight to fourteen modulation (EFM). The record data, thus encoded by the encoder 15, is supplied to the magnetic head driving circuit 16.

The magnetic head 4 is connected to the magnetic head driving circuit 16 for applying a modulation magnetic field conforming to the record data to the magneto-optical disc 2.

On the other hand, system controller 7 executes a recording position controlling operation for memory 14 and, based on the controlling operation, executes a disc recording position control so that the record data read out in a burst fashion from memory 14 will be recorded continuously on the recording track of the magneto-optical disc 2, as shown in FIG. 6. For recording position control, the recording position of the record data read out in a burst fashion from memory 14 is supervised by the system controller 7 and control signals designating the record position on the recording track of the magneto-optical disc 2 are supplied to the servo control circuit 6.

With the present recording system of the disc recording and/or reproducing apparatus, by controlling the memory 14 by the system controller 7 in the above described manner, the ADPCM audio data continuously outputted from the ADPCM encoder 13 at the transfer rate of 18.75 sectors/second, are continuously written into memory 14 at the transfer rate of 18.75 sectors/second and, when the data volume stored in the memory 14 exceeds the predetermined volume K, the predetermined volume K of the ADPCM audio data are read out in a burst fashion from memory 14 as record data at the transfer rate of 75 sectors/second, so that the input data may be continuously written into the memory 14, while a vacant space for more than a predetermined volume is maintained at all times in the memory 14. On the other hand, the record data read out in a burst fashion from the memory 14 may be continuously recorded on the recording tracks of the magneto-optical disk 2 by controlling the recording position on the recording track of the magneto-optical disc 2 by the system controller 7. Moreover, since the vacant space in excess of the predetermined data volume is perpetually maintained in the memory 14, input data may be continuously written in the vacant space of more than the predetermined data volume, even if the system controller 7 detects the occurrence of a track jump or the like due to disturbance or the like to interrupt the recording operation on the magneto-optical disc 2, and the resetting operation may be executed in the interim, so that the input data may be continuously written on the recording track of the magneto-optical disc 2.

Meanwhile, there are recorded on the magneto-optical disc 2 header time data corresponding to the physical address of the sector by being appended sector by sector to the ADPCM audio data. Table-of-contents data indicating the recording region and the recording mode are recorded in the table-of-contents region.

The reproducing system in the disc recording and/or reproducing apparatus is hereinafter explained.

The reproducing system is designed for reproducing the record data continuously recorded by the above described recording system on the recording track of the magneto-optical disc 2, and is provided with a decoder 21, to which is supplied a playback output, which has been generated by the optical head 3 tracing the recording track on the magneto-optical disc 2 with a laser light, and which has been converted into binary format signals by the RF circuit 5.

The decoder 21 is a counterpart of the encoder 15 in the above described recording system, and processes the playback output, converted into the binary format signals by the RF circuit 5, with the above mentioned decoding operation or with the EFM decoding operation, while reproducing the above mentioned B level stereo mode ADPCM audio data at a transfer rate of 75 sectors/second which is faster than the normal transfer rate for the above mentioned B level stereo mode. The reproduced data, generated by the decoder 21, is supplied to a memory 22.

The memory 22 has its data writing and readout controlled by the system controller 7 so that the playback data supplied from decoder 21 at the transfer rate of 75 sectors/second is written in a burst fashion at the transfer rate of 75 sectors/second. Also the playback data written in a burst fashion at the transfer rate of 75 sectors/second in the memory 22 are continuously read out at the regular B level stereo mode transfer rate of 18.75 sectors/second.

The system controller 7 executes, besides the above mentioned memory control operation for memory 22, a reproducing position control from the recording track of the magneto-optical disc 2, in such a manner that the playback data written in a burst fashion by the above mentioned memory control in the memory 22 is continuously reproduced from the recording track of the disc 2. The reproducing position control is executed by supervising a reproducing position on the disc of the above mentioned playback data written in a burst fashion in the memory 22 by the system controller 7 and by supplying a control signal designating the reproducing position on the recording track of the magneto-optical disc 2 to the servo control circuit 6, as shown in FIG. 6.

The B-level stereo mode ADPCM audio data, obtained as playback data read out continuously from memory 22 at a transfer rate of 18.75 sectors/second, are supplied to the ADPCM decoder 23.

This ADPCM decoder 23 is a counterpart of the ADPCM encoder 13 of the recording system, and has its operating mode designated by the system controller 7. With the present disc recording and/or reproducing apparatus, the B level stereo mode ADPCM audio data are expanded by a factor of four for reproducing the digital audio data. The reproduced digital audio data is transmitted by the ADPCM decoder 23 to a D/A converter 24.

The digital audio data from the ADPCM decoder 23 are converted by the D/A converter 24 into an analog audio signal $A_{OUT}$. The analog audio signal $A_{OUT}$, generated at the D/A converter 24, is outputted via a low-pass filter 25 at an output terminal 26.

The reproducing system of the disc recording and/or reproducing apparatus of the present invention is provided with a digital outputting function so that the digital audio data at the output of the ADPCM decoder 23 is outputted at a data output terminal 28 via a digital output encoder 27 as a digital audio signal $D_{OUT}$.

With the above described reproducing system of the disc recording and/or reproducing apparatus, the system controller 7 controls the memory 22 in such a manner that the B-level stereo mode ADPCM audio data reproduced from the recording track of the magneto-optical disc 2 is written in a burst manner in the memory 22 at a transfer rate of 75 sectors/second, and read out continuously from the memory 22 as playback data at the transfer rate of 18.75 sectors/second, so that the playback data may be continuously read out from the memory 22 while the data-depleted region in excess of the predetermined volume L is perpetually maintained within memory 22. Also the playback data intermittently read out from the magneto-optical disc 2 may be continuously reproduced from the recording track on the magneto-optical disc 2 by controlling the reproducing position on the recording track of the disc by the system controller 7. In addition, the data read-out region in excess of the predetermined volume L is perpetually maintained in the memory 22, as described previously, so that, even when the system controller 7 should detect an occurrence of a track jump etc. due to, for example, disturbances, and the operation of reproducing the magneto-optical disc 2 is discontinued, the playback data may be read out from the data read-out region having a space in excess of the predetermined data volume to continue outputting analog audio signals and resetting may be performed in the interim.

With the above optical disc recording and/or reproducing apparatus, description has been made of recording and reproduction of the B-level stereo mode ADPCM audio data. However, recording and reproduction may similarly be made of the ADPCM audio data of other modes of the other CD-I systems. As long as the PCM audio data of the CD-DA mode is concerned, time compression may be made in the memory 14 in the recording system, while record data may be recorded during the time when the magneto-optical disc 2 is rotationally driven at a velocity conforming to the compression ratio of time compression. Also, time compression may be made in the memory 22 in the reproducing system 22.

Meanwhile, a data compression system other than the ADPCM system may be employed without any inconvenience.

With the above described encoding apparatus according to the present invention, first check words by first error correction code are generated in the first check word generating means from data which have been given different amounts of delay by first delay means, while second check words by second error check code are generated in the second check word generating means from data from the second delay means with the same amount of delay, so that the apparatus has the correcting capabilities equivalent to those of the customary CIRC. Since the first delay circuit apples different amounts of delay to respective bit data constituting a data block, while the second delay circuit applies different amounts of delay to the respective bit data from the first delay means, with the sum-total of the delay amounts applied to the respective bit data by the first and second delay means being the same. Thus the encoded data are not interleaved, so that the risk of error distribution on occurrence of burst errors exceeding the correction capabilities in the transmission system may be eliminated.

With decoding apparatus according to the present invention, the respective bit data constituting a data block encoded by the encoding apparatus are processed by the first error correcting means by error correction by the second error correction code using the second check word, while the respective bit data from the first delay means applying the same amount of delay as that by the first delay means of the encoding apparatus to the respective bit data thus corrected for error by the first error correcting means are processed by error correction by the first error correcting code by the second error correction means using the first error correction code, so that the apparatus has the correction capabilities equivalent to those of the customary CIRC. The respective bit data, corrected for errors by the first and second error correcting means, are given the same amount of delay by the second delay means as that given by the second delay means of the encoding apparatus, before being outputted, so that, even if burst errors exceeding the correction capabilities should occur in the transmission system, the errors are not distributed, so that data defects may be minimized.

What is claimed is:

1. An error correction encoding apparatus for processing input data series with an encoding for error correction, including:

first delay means for applying different amounts of delay to respective data words constituting a data block for converting input data series in a first array state into input data series in a second array state, first error correction encoding means for generating first check word series from data word series in said second array state, second delay means for applying different amounts of delay to the data word series in said second array state and to said first check word series for converting said data word series and said first check word series into data words and check word series in a third array state, and second error correction encoding means for generating second check word series from said data words and said check word series in the third array state, the amounts of delay applied by said first and second delay means being set so that the array state of said data words in said third array state is the same as the array state of said data word series in said first array state.

2. An error correction encoding apparatus as claimed in claim 1, further comprising:

third delay means for applying the same amount of delay to either the even-numbered data words or the odd-numbered data words of said data words in said third array state, and fourth delay means for applying the same amount of delay as that by said third delay means to the other of said even-numbered data words and said odd-numbered data words of said data words in said third array state, to said check word series in said third array state, and to the second check word series.

3. An error correction encoding apparatus as claimed in claim 2, further comprising sign-inverting means for inverting the signs of said check word series in said third array state and of said second check word series.

4. An error correction encoding apparatus as claimed in claim 1, wherein said first and second check word series are parity codes by a Reed-Solomon code.

5. An error correction encoding apparatus as claimed in claim 1, wherein said input data series are in a data compressed state.

6. An error correction decoding apparatus for performing error correction decoding on input data words on which error correction encoding has been executed by applying different amounts of delay to data words constituting a data block of data series in a first array state for converting said data series into data word series in a second array state, generating first check word series from the data word series in said second array state, applying different amounts of delay to said data word series in said second array state and said first check word series for converting said data word series and said first check word series into data word series and check word series in a third array state, generating second check word series from the data word series and the check word series in the third array state, so that the array state of the data word series in said third array state is equal to the array state of said data word series in said first array state, said error correction decoding apparatus comprising:

first error correction decoding means for processing the input data words constituting a data block of the data word series in said third array state and the check word series in said third array state by error correction by a second error correction code using said second check word series, first delay means for applying different amounts of delay to said data word series and said check word series corrected for errors by said first error correction decoding means for converting said data word series and said check word series into the data word series in said second array state and the first check word series, second error correcting decoding means for error-correcting said data word series in said second array state by a firs error correction code using said first check word series, and second delay means for applying different amounts of delay to said data word series corrected for errors by said second error correcting decoding means for converting said data series into data word series in said first array state.

7. An error correction decoding apparatus as claimed in claim 6, further comprising:

third delay means for applying the same amount of delay to either the even-numbered data words and check words or the odd-numbered data words and check words of said third array state, and fourth delay means for applying the same amount of delay as that by said third delay means to the other of said even-numbered data words and said odd-numbered data words of said third array state.

8. An error correction decoding apparatus as claimed in claim 7, further comprising sign-inverting means for inverting the signs of said check word series in said third array state and of said second check word series.

9. An error correction decoding apparatus as claimed in claim 6, wherein said first and second check word series are parity codes by a Reed-Solomon code.

10. An error correction decoding apparatus as claimed in claim 6, wherein said input data word series are in a data compressed state.

11. An error correcting decoding apparatus as claimed in claim 6, wherein said input data word series are data series reproduced from a recording medium.

* * * * *